March 24, 1959 S. A. PROCTER 2,879,330
ENERGY-TRANSFER CIRCUIT
Filed Feb. 18, 1955 2 Sheets-Sheet 1
FIG. 1
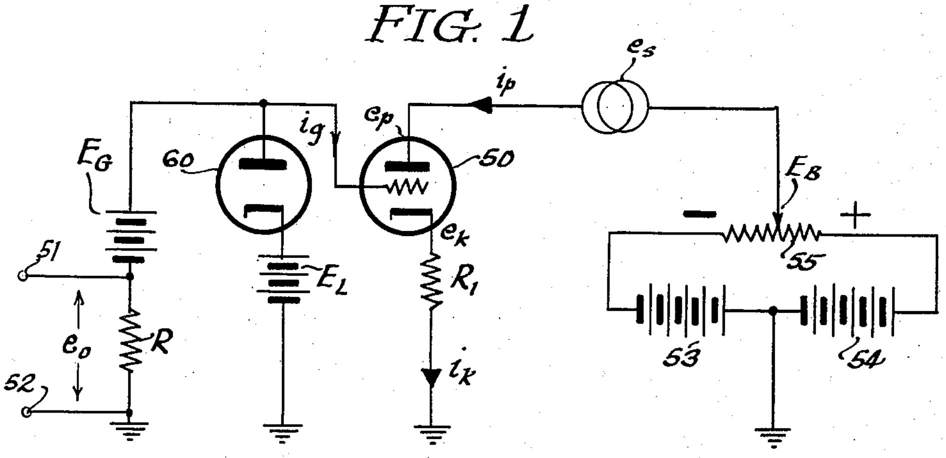
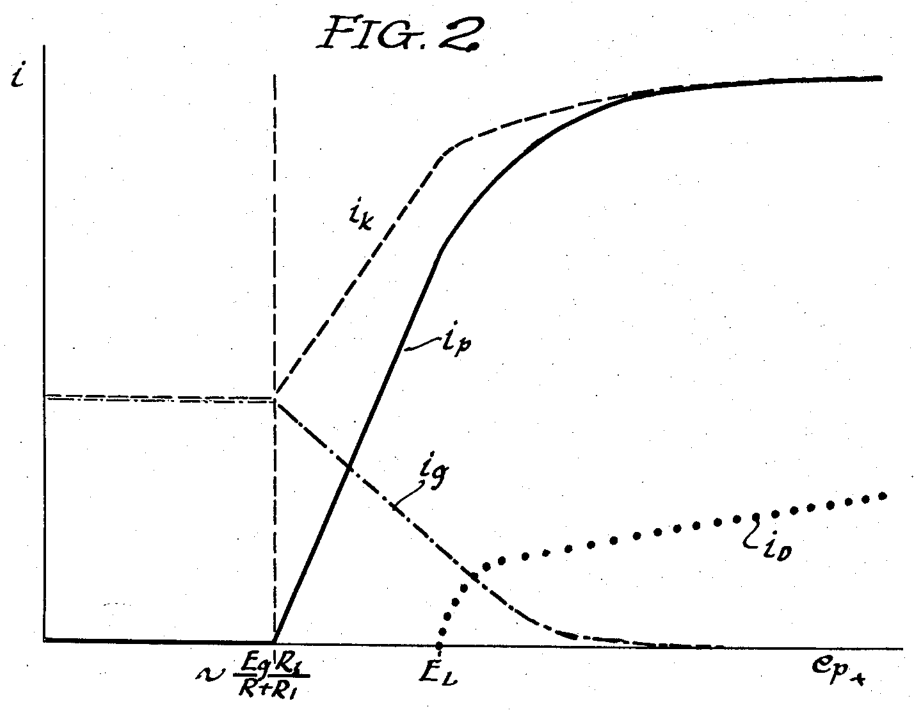
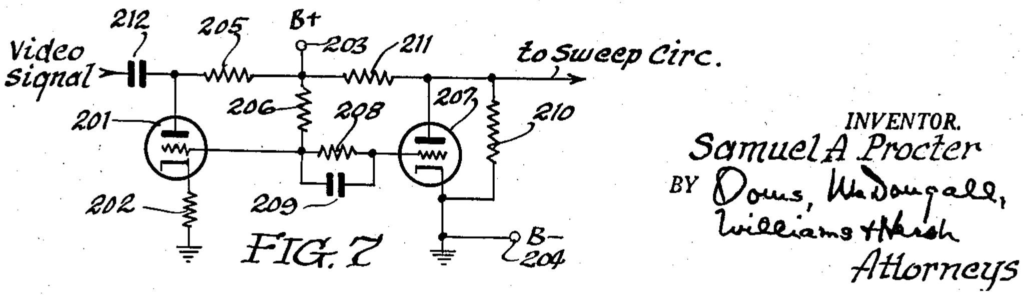
INVENTOR.
Samuel A Procter
BY Dows, McDougall, Williams + Hirsh
Attorneys INVENTOR.
Samuel A. Procter
BY Dows, McDougall, Williams + Hersh,
Attorneys

United States Patent Office 2,879,330

Patented Mar. 24, 1959

2,879,330

ENERGY-TRANSFER CIRCUIT

Samuel A. Procter, Chicago, Ill.

Application February 18, 1955, Serial No. 489,096

6 Claims. (Cl. 178—7.3)

This invention relates to the broad field of vacuum-tube circuits and is concerned specifically with a novel circuit which permits transfer of voltages within predetermined limits from a source to a load while maintaining an extraordinary degree of isolation between the source and the load.

In the present invention, I provide a vacuum-tube circuit comprising a tube having a cathode, control grid, and an anode, in which the signal voltage is applied to the anode and the load is coupled to the grid. This novel circuit arrangement provides energy-transfer characteristics of remarkably advantageous nature, particularly in that the circuit provides inherent gating or clipping action on both the top and bottom of the signal waveform, the gating or clipping thresholds being conveniently adjustable to any desired value within wide limits.

As a further advantage of my invention, the clipping action may be accomplished without the charging of capacitors and consequently without any of the "grid-leak bias" complications commonly encountered in other types of non-linear vacuum-tube circuits My invention, moreover, is characterized by great flexibility, in that the limiting action can be controlled at will over a very wide range, so as to permit transmission to the load of any desired portion of an applied signal. That is, with my invention, one can readily pick out and transmit to the load a given segment of an applied signal waveform, the width of the segment and the portion of the wave from which it is taken being entirely within the control of the operator.

By reason of its extreme flexibility in wave clipping, my invention may also be employed as a means of generating rectangular waves from a sine-wave source, the time-distribution characteristics of such rectangular waves being within the operator's control. That is, by my invention, symmetrical or square waves may be derived from a sine-wave source or, at will, the rectangular waves may be made non-symmetrical—that is, positive for a greater fraction of the period than negative, or vice versa.

All the foregoing characteristics and applications of my invention constitute its objects and advantages, and still other objects and advantages will appear from the following detailed description of my basic circuit and of several illustrative applications thereof.

In the appended drawings, I have shown in Figure 1 a simplified basic circuit to which I shall refer in describing the principles of my invention, and in Fig. 2 I have presented a graph which shows the variation of certain currents in my basic vacuum-tube circuit as the voltage applied to the anode is varied from zero to a large value.

Fig. 7 illustrates another application of my invention, illustrative of its application as a sync separator and noise stripper in a television receiver.

Figure 3:
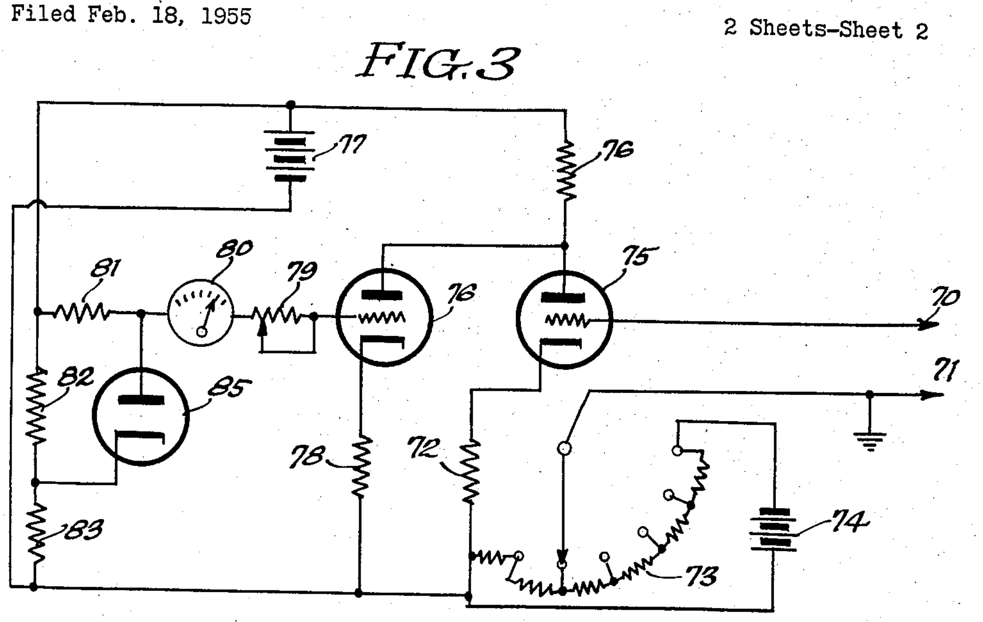
Fig. 3 shows my circuit applied as a vacuum-tube voltmeter, an application in which my invention finds particularly useful application in that it permits the use of an extremely sensitive indicating meter without any danger of damage thereto by reason of excessive current. (To provide such an improved vacuum-tube voltmeter is another of the objects of my invention.)

In Fig. 1, the basic circuit of my invention, I show a triode 50, provided with a resistor $R_1$ connecting the cathode thereof to ground. The instantaneous cathode current is schematically indicated by the symbol $i_k$. The grid of triode 50 is connected to the positive terminal of a voltage source designated $E_G$, the negative terminal of source $E_G$ being connected to ground through a resistor R. A pair of output terminals 51 and 52 are provided, being bridged across the resistor R.

Also, the grid of triode 50 is connected to the plate of a diode 60, the cathode of diode 60 being connected to the positive terminal of a voltage source designated $E_L$. The negative terminal of the voltage source $E_L$ is grounded.

The plate of triode 50 is connected to a source of signal voltage designated $e_S$, in series with a source of plate-supply voltage designated $E_B$. To bring out the fact that the supply voltage $E_B$ may range over wide limits and may be either positive or negative, the voltage source $E_B$ is shown in the drawing as a pair of batteries 53 and 54, connected in series and having their junction grounded, a potentiometer 55 being bridged across the respective positive and negative extremities. The movable arm of potentiometer 55 is then connected to the signal source $e_S$, as shown.

The operation of this circuit may best be understood with reference to Fig. 2, which shows various currents plotted as a function of plate voltage. (The plate voltage—that is, the voltage between the plate of triode 50 and ground—is indicated in Figs. 1 and 2 with the symbol $e_p$. The instantaneous plate current is indicated in those figures with the symbol $i_p$, and the instantaneous grid grid current is correspondingly designated $i_g$. The output voltage, appearing across the terminals 51 and 52, is designated $e_o$.)

In this circuit, the particular values chosen for the fixed voltages and the circuit elements will depend to considerable degree on the intended application and the tubes chosen. As will be understood presently from the description which follows, the choice of voltages will in general depend on the desired transfer characteristics—that is, the range of signal voltage over which it is desired to procure a corresponding output voltage.

Similarly, the same considerations will influence the choice of resistor sizes. Therefore, I shall not in this description commit myself to any particular values of voltage and resistance, although I shall describe briefly the design considerations which will influence their choice.

The grid-bias battery $E_G$ is larger in value than the diode-bias battery $E_L$, and the resistors R and $R_1$ are sufficiently large to limit the maximum grid current of triode 50, and the maximum diode current of tube 60, to safe values with the voltages and tubes being employed.

The operation of the Fig. 1 circuit can best be understood by considering what happens when the signal voltage $e_S$ is zero and the plate voltage $e_p$ is gradually increased from a low value to a high value.

When the plate voltage is at any value below a certain critical value presently to be defined, the plate current is zero and the grid current $i_g$ is a constant, having some value which will be determined by the characteristics of tube 50, the voltage of battery $E_G$, and the sizes of resistors R and $R_1$. Under those conditions, the diode 60 will not be conducting, since the net voltage on its plate, which is equal to $E_G - i_g R$, will be less than the voltage on its cathode, that is, the voltage of battery $E_L$.

Under the conditions just described, the cathode current $i_k$ will be equal to the grid current $i_g$, since no plate current will be flowing, and the cathode voltage $e_k$ will be approximately equal to $$\frac{E_G R_1}{R+R_1}$$

(This approximation assumes that the grid-to-cathode impedance of triode 50 will be negligibly small compared to the values of resistors R, $R_1$ when grid current is flowing; this assumption is met by virtually all triodes in use today if the total values of R and $R_1$ is several thousand ohms or more.)

Now assume that the plate voltage $e_p$ is made more positive from any arbitrary low starting voltage. As the plate voltage reaches the voltage of the cathode, approximately $$\frac{E_G R_1}{R+R_1}$$

plate current will start to flow. As the plate voltage rises still further, the increasing plate current will add to the cathode current and consequently raise the voltage across $R_1$. This, in turn, will reduce the effective voltage available for driving grid current through tube 50, since the polarity of the voltage across $R_1$ "bucks" the voltage of the battery $E_G$. Consequently, the grid current $i_g$ will go down as the plate voltage increases, and the voltage $e_o$ across the output terminals 51 and 52 will likewise decrease proportionately, since that voltage is equal to $i_g R$.

As the plate voltage increases still further, it will presently reach and exceed the voltage $E_L$, which is the bias battery in the circuit of diode 60. When the plate voltage exceeds the value $E_L$, diode 60 will commence to conduct. That this is so will be evident from the following considerations: Once the plate voltage exceeds the value $$\frac{E_G R_1}{R+R_1}$$

the cathode voltage will rise in step with the plate voltage, being very slightly below the plate voltage, and the grid voltage will likewise go up, being at all times within a fraction of a volt of the cathode potential. When the plate voltage exceeds the voltage of the bias battery $E_L$, however, the diode 60 will commence to conduct, since its plate will then be more positive than its cathode. As the plate voltage goes up further beyond the value $E_L$, the grid can no longer rise in step with it, so the grid will become negative relative to the cathode of triode 50 and the current $i_g$ will approach zero quite rapidly, the output voltage $e_o$ meanwhile remaining nearly constant at a value approximately equal to $E_G - E_L$.

Further increase in the plate voltage will have very little further effect on the plate current.

The changes just described in the various currents as a function of plate voltage are shown graphically in Fig. 2. The drop in grid current is quite rapid as the plate voltage is increased beyond $E_L$ and will have dropped virtually to zero within a very small change of voltage above that value. The cathode current, being equal at all times to the sum of the grid and plate currents, will start off at a constant value equal to $i_g$, and will rise gradually while the plate voltage increases between the values $$\frac{E_G R_1}{R+R_1}$$

and $E_L$, a voltage range which I call the "transfer range." As the plate voltage passes through the value $E_L$, the cathode current will gradually level off at a value equal to $i_p$, and will remain virtually constant through any additional increase in plate voltage. At all values of plate voltage above the value $E_L$, diode current $i_D$ will flow, through diode 60 and resistor R.

The output voltage $e_o$, appearing at terminals 51 and 52, is fixed at the constant value $i_g R$ for all values of plate voltage below the transfer range, varies linearly with the plate voltage within the transfer range, and, at values of plate voltage above $E_L$, is substantially equal to $i_D R$, a nearly constant voltage approximately $E_G - E_L$.

It will be apparent that the position and width of the transfer range can be set to any value desired within wide limits, merely by varying $E_G$ and $E_L$.

All the foregoing discussion, it will be recalled, was based on the assumption that the signal voltage $e_S$ was equal to zero. Now assume that a signal voltage be applied, in series with the plate-supply voltage $E_B$. The result, of course, will be a variation in the instantaneous plate voltage $e_p$ in accordance with the waveform of the voltage $e_S$, above and below the D.-C. plate potential determined by the setting of potentiometer 55.

At all times during which the instantaneous plate voltage $e_p$ is within the transfer range, it will be faithfully reproduced at the output terminals 51 and 52. At all other times the output voltage at those terminals will be virtually constant—either equal to $i_g R$ or $i_D R$, depending on whether the plate voltage be above or below the transfer range.

If the diode 60 and the bias battery $E_L$ be omitted from the circuit, the transfer characteristic is unchanged for low values of plate voltage, but, instead of cutting off sharply at an arbitrary upper value of plate voltage equal to $E_L$, the transfer characteristic on the upper side—that is, with increasing plate voltages—gradually becomes nonlinear. In other words, the output voltage will linearly "follow" the input voltage for a substantial transfer range and will then approach zero asymptotically as the plate voltage is indefinitely increased.

The dynamic response of the system is essentially identical to its static response over a very wide range of frequency, the principal limiting factor being the interelectrode capacitances, particularly the grid-plate capacitance. Since many triodes have grid-plate capacitances of the order of two mmf. or less, excellent performance may readily be obtained up to a frequency of several megacycles per second.

Assuming that the D.-C. plate voltage be fixed at a value intermediate in the transfer range and that the peak value of $e_S$ is at no time great enough to throw the plate voltage out of the transfer range, the waveform of the output voltage $e_o$ will be a faithful replica of the input voltage $e_S$. The relative magnitude of the output signal, compared to the input signal, will be slightly less than unity for normal values of load resistor R, although, as will be apparent to those skilled in the art, the transfer factor or "gain" may be made as low as desired by making R smaller.

Fig. 3 shows a specific application of the basic circuit of Fig. 1 in a vacuum-tube voltmeter of the differential type. Referring to that figure, I have shown a pair of probes 70 and 71, of which probe 71 is grounded and probe 70 is connected to the grid of triode 75. Probe 71 is connected to the cathode of tube 75 through a cathode resistor 72 and a tapped voltage divider 73, across which is bridged a source of reference voltage shown in the drawing as battery 74. The range of voltage measured by the instrument will depend on the selected setting of the tapped divider 73; that is, at one tap it might read from 10 vols to 20 volts, at the next tap from 20 volts to 30 volts, and so on.

The plate of triode 75 is connected through a load resistor 76 to the positive terminal of a B-battery 77, the negative terminal of which is returned to the lower end of cathode resistor 72.

All the vacuum-tube voltmeter structure just described is conventional per se; the novel aspect of the illustrated circuit lies in the combination of the voltmeter tube 75 with my coupling or transfer tube 76. As will be observed the plate of tube 76 is connected to the plate of tube 75, so that the voltage developed on the plate of tube 75 responsively to the unknown voltage applied between the probes is transmitted directly to the plate of tube 76. The cathode of tube 76 is connected to the negative terminal of battery 77 through cathode resistor 78 (corresponding to resistor $R_1$ of Fig. 1). The grid of tube 76 is connected through an adjustable resistor 79 to one terminal of a current-responsive D.-C. meter 80, the other terminal of meter 80 being connected through resistor 81 to the positive terminal of voltage source 77. A voltage divider comprising resistors 82 and 83 is bridged across battery 77, and diode 85 has its plate connected to one terminal of meter 80 and its cathode connected to the junction of resistors 82 and 83.

In the operation of this instrument, it will be understood that the meter 80 cannot possibly be subjected to excessive current no matter what voltages may be applied to the probes 70 and 71. The maximum current that can ever pass through meter 80 is the grid current flowing in tube 76 under conditions when the tube 76 has no plate current flowing. That value of current can be set at any arbitrarily desired value by adjustment of resistor 79, and normally it will be set to provide full-scale deflection of the meter 80. Similarly, the current through meter 80 can of course not drop below zero—that is, cannot reverse its direction. Therefore, it is in the Fig. 3 instrument entirely practical to operate the vacuum-tube voltmeter with "infinite impedance" input, the delicate indicating instrument 80 being protected against damage regardless of the external conditions prevailing at the probes 70, 71.

Notwithstanding this complete immunity from meter overload, the instrument will provide faithful linear indications of voltage changes at the probes 70 and 71 for all voltages within the desired range. Meter calibration, of course, is a matter of design, according to the needs of the particular application.

It will be understood that the particular voltmeter circuit shown in Fig. 3 is merely illustrative. Persons skilled in the art will be readily able to adapt my novel transfer circuit for use with other types of vacuum-tube voltmeters and thereby procure the advantages of my circuit.

Figure 4:
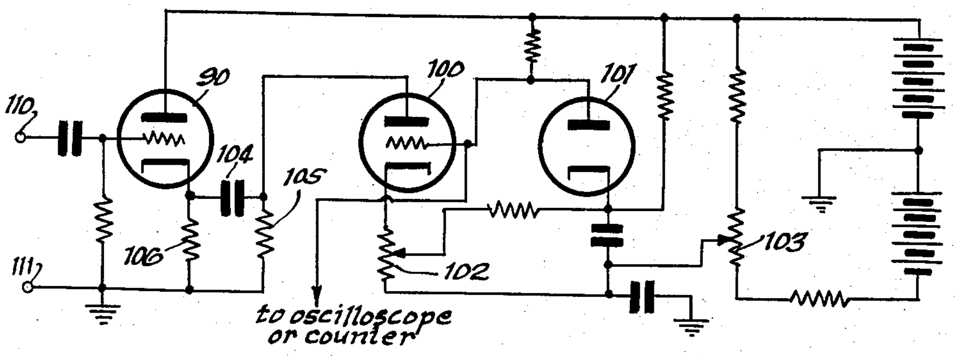
Fig. 4 shows my circuit applied as a waveform analyzer, Figs. 5 and 6 being graphic figures useful in explaining the operation of the Fig. 4 embodiment of my invention.
Figure 5:
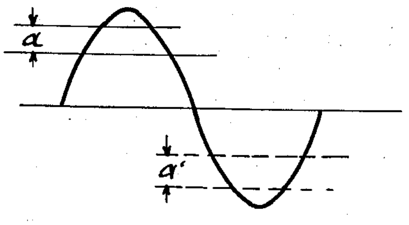
Figure 6:
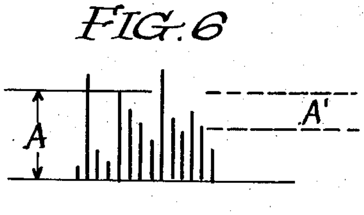

Another application of my invention is shown in Fig. 4 and further illustrated in Figs. 5 and 6. This is a wave-analyzer circuit comprising input tube 90, transfer tube 100, and diode 101. The input tube 90 is connected as a conventional cathode follower and is employed merely to provide the wave analyzer with the highest possible input impedance. The plate of the transfer tube 100 is connected directly to the cathode of tube 90, and tubes 100 and 101 are wired in essentially the same manner as shown in the basic Fig. 1 circuit, except that, instead of showing individual biasing batteries for the grid and diode circuits, I have shown the voltages suitably obtained, by means of adjustable voltage dividers, from a single voltage source.

It will of course be understood that in all the figures of the drawing my portrayal of batteries as D.-C. voltage sources is merely symbolic, since in most cases some suitable rectifier-filter power supplies will be used in practical apparatus, rather than chemical batteries.

By suitable adjustment of potentiometers 102 and 103 the width, in terms of volts, of the "transfer range" of my invention can be adjusted within wide limits and, equally significant, the position of the transfer range with respect to the plate voltage of transfer tube 100 can be similarly adjusted. The voltage which marks the lower limit of the transfer range may be selected by adjustment of potentiometer 103, since that potentiometer governs the static cathode potential of triode 100. The voltage which governs the upper limit of the transfer range may be selected by adjustment of potentiometer 102, which controls the static potential of the cathode of diode 101. As will be noted from the circuit diagram, the transfer range may be placed at voltages which are either positive or negative relative to ground.

The coupling circuit between the cathode follower 90 and the transfer tube 100 comprises a capacitor 104 and a resistor 105. The time constant of the coupling circuit 104, 105 may be made as large as desired, depending on the period of the waves to be analyzed, but the resistor 105 and the cathode resistor 106 of tube 90 should be kept small enough so that their sum is at all times much less than the effective plate-to-cathode impedance of transfer tube 100. For most triodes, this effective impedance will at all times be relatively large—100,000 ohms or more. Consequently, the sum of the resistances of elements 105 and 106 should be held in the neighborhood of 10,000 ohms or less. This condition is desirable in order to prevent the development of additional static charge in the nature of "grid-leak bias" on capacitor 104, and is practicable because the output impedance of cathode follower 90 will typically be at most a few hundred ohms. Thus cathode follower 90 will not be appreciably loaded by the coupling circuit 104, 105 even though its impedance is but a few thousand ohms.

With the circuit designed in that manner, the plate of tube 100 operates at D.-C. ground potential and swings positive and negative in accordance with the variations in the wave applied at input terminals 110 and 111 and reproduced on the plate of tube 100. The appropriate adjustment of the potentiometers 102 and 103, any selected segment of that waveform, either positive or negative, may be reproduced at the grid of tube 100. This is illustrated graphically in Fig. 5 where the transfer range is indicated by the sector marked *a*. As Fig. 5 shows, the transfer range may, if desired, be moved to the negative portion of the waveform, as indicated by the dotted sector designated *a'*. Similarly, the width of the transfer range, that is, the part of the wave produced at the grid of tube 100, may be extended or reduced at will, by adjustment of potentiometer 102.

As will be readily understood by persons skilled in the art, a wave analyzer thus employing the principles of my invention can be an exceedingly useful and versatile working tool, since an oscilloscope connected to the grid of transfer tube 100 can be made to show that portion, and only that portion, of a given wave of which detailed study is desired.

Fig. 6 shows how the Fig. 4 device can usefully be employed in connection with a counter for the purpose of pulse-height analysis. The transfer range, designated A in Fig. 6, can be adjusted so as to embrace pulses in whatever range of amplitudes is desired. Thus, the transfer range marked A would feed to the counter all the pulses in a given train, while raising the lower threshold, as in the dotted range designated A', would cut off from the counter all those pulses whose amplitudes lay below the lower limit of the transfer range.

As will be understood by persons skilled in the art, appropriate adjustment of the transfer range to successive values will permit accurate analysis of the frequency of pulses as a function of their amplitudes.

Fig. 7 shows the application of my invention as a sync separator and noise stripper in a television receiver. In Fig. 7, I show the video signal being applied to the plate of a transfer tube 201. The television signal, as persons familiar with the art will readily understand, consists of a train of spaced synchronizing pulses having a given peak amplitude, with video information of lower amplitude being distributed on the waveform between the successive sync pulses. In addition, if the signal is near the noise level, there may be random noise pulses superimposed on the waveform of even higher peak amplitude than the synchronizing pulses.

With my invention, as shown in Fig. 7, the synchronizing pulses may be separated from the video signal, and noise pulses of greater amplitude than the sync pulses may be clipped off, the circuit being automatically responsive to changes in signal level. In other words, the Fig. 7 circuit is characterized by automatic adjustment of the transfer range to accommodate the particular signal conditions being encountered.

The circuit will be recognized as consisting essentially of my novel transfer tube followed by a triode amplifier. The cathode of transfer tube 201 is connected to ground through a resistor 202. The plate of tube 201 is connected through resistor 205 to the positive terminal 203 of a suitable D.-C. voltage supply, the negative terminal 204 being grounded. The positive terminal 203 is also connected through resistor 206 to the grid of tube 201. The grid of tube 201 is also connected to the grid of triode 207 through a resistor 208, which is shunted by capacitor 209.

A resistor 210 is connected between the plate of tube 207 and its cathode, which, in turn, is grounded. The plate of tube 207 is connected through a resistor 211 to positive terminal 203.

Incoming video signals are applied to the plate of transfer tube 201 through capacitor 212.

In a typical application, the positive voltage supply used was 250 volts, capacitors 212 and 209 were 0.1 mf., resistor 202 was 47,000 ohms, resistors 205 and 208 were 1.2 megohms, and resistor 206 was 180,000 ohms. The resistors 210 and 211 are actually a part of the horizontal sweep circuit of the receiver and their values do not affect the operation of my invention. Their values will be whatever is appropriate to the particular sweep circuit being used in the receiver.

In this form of the invention, the grid and cathode of the sync amplifier tube 207 correspond in function to the diode 60 of Fig. 1.

With no signal applied, the grid and plate of tube 201 are only slightly more positive than the cathode. When a signal is applied, the plate current flowing through tube 201 during the positive portions of the signal increases the charge in capacitor 212, making the D.-C. potential of tube 201 negative with respect to its cathode. This moves the lower limit of the transfer range from zero to a negative voltage that approximates the so-called "blanking level."

The top limit of the transfer range is governed by the action of the coupling circuit comprising capacitor 209 and resistor 208. The signal appearing at the grid of tube 207 initially drives the grid of tube 207 into positive territory, causing grid current to flow and causing a charge to accumulate on capacitor 209. Since the time constant of the circuit comprising elements 208 and 209 is quite long compared to the interval between synchronizing pulses, this charge on capacitor 209 is held from cycle to cycle and acts as a bias voltage fixing the upper limit of the transfer range at the voltage which corresponds substantially to the most positive portion of the synchronizing pulses.

The result, appearing at the plate of tube 207, is an output signal consisting of the synchronizing pulses, stripped of the video signals and having no random noise pulses greater in amplitude than the synchronizing pulses themselves.

While I have in the present specification described in considerable detail several specific embodiments of my invention, it is to be understood that this description has been illustrative only, and that many variations and modifications of the structures shown and described may be made by persons skilled in the art without departing from the spirit of my invention.

I claim:

1. A signal-transfer circuit comprising an electron-discharge tube having a cathode, a grid, and an anode, resistor means connected between said cathode and ground, circuit means comprising a voltage supply and resistance means connected between said grid and ground and operative to impose on said grid a bias voltage which is positive with respect to said cathode, means for applying a unidirectional bias voltage between said anode and ground, and signal-input means connected to said anode for applying thereto a signal voltage, means whereby said signal-input means and said bias-voltage means are operative in combination to provide a resultant positive anode potential relative to said cathode during at least an interval of each cycle of said signal, said tube being operative to pass space current between said cathode and said anode during said intervals.

2. A signal-transfer circuit comprising an electron-discharge tube having a cathode, a grid, and an anode, resistor means connected between said cathode and ground, circuit means comprising a voltage supply and resistance means connected between said grid and ground and operative to impose on said grid a bias voltage which is positive with respect to said cathode, means for applying a unidirectional bias voltage between said anode and ground, signal-input means connected to said anode for applying thereto a signal voltage, rectifier means comprising an anode and a cathode, circuit means connecting the anode of said rectifier to said grid and the cathode of said rectifier to ground, said circuit means comprising means operative to provide for said rectifier means a bias voltage, means whereby said signal-input means and said first bias-voltage means are operative in combination to provide a resultant positive anode potential relative to said cathode during at least an interval of each cycle of said signal, said tube being operative to pass space current between said cathode and said anode during said intervals.

3. A signal-transfer circuit comprising an electron-discharge tube having a cathode, a grid, and an anode, resistor means connected between said cathode and ground, circuit means comprising a voltage supply and resistance means connected between said grid and ground and operative to impose on said grid a bias voltage which is positive with respect to said cathode, means for applying a unidirectional bias voltage between said anode and ground, signal-input means connected to said anode for applying thereto a signal voltage, and signal-output means coupled to said grid, means whereby said signal-input means and said bias-voltage means are operative in combination to provide a resultant positive anode potential relative to said cathode during at least an interval of each cycle of said signal, said tube being operative to pass space current between said cathode and said anode during said intervals.

4. Apparatus according to claim 2 wherein means are provided for adjusting to any predetermined value within a range the magnitude relative to ground of said grid bias voltage and said rectifier bias voltage.

5. In a receiver for receiving television signals comprising a train of periodic synchronizing pulses having video signals interspersed therebetween, a synchronizing-signal separator circuit comprising a vacuum tube having a cathode, a grid, and an anode, capacitor means for applying said synchronizing and video signals to said anode, resistor means connecting said anode to the positive side of a direct-current voltage source, second resistor means connecting said cathode to the negative side of said voltage source, additional resistor means connecting said grid to a source of positive voltage operative to bias said grid positively with respect to said cathode, and signal-output means coupled to said grid operative to derive therefrom a signal consisting of a train of synchronizing pulses, the ohmic values of said anode and cathode resistor means being chosen with respect to the characteristics of said tube to provide for said capacitor means at a time constant when said tube is conducting anode current that is substantially shorter than its time constant when no such anode current is flowing.

6. Apparatus according to claim 5 wherein said signal-output means comprises a rectifier having an anode and a cathode, and circuit means coupling the anode of said rectifier to said grid and the cathode of said rectifier to the negative side of said voltage source, said circuit means having an additional capacitor operative in the presence of a television signal to store a D.-C. charge and thereby to bias said rectifier.

References Cited in the file of this patent

UNITED STATES PATENTS

| | | |
|---|---|---|
| 1,846,043 | Terman | Feb. 23, 1932 |
| 2,215,175 | Fewings | Sept. 17, 1940 |
| 2,534,928 | Schneeberger | Dec. 19, 1950 |